(12) United States Patent
Camillo et al.

(10) Patent No.: US 8,338,504 B2
(45) Date of Patent: Dec. 25, 2012

(54) METHOD OF TREATING AND COMPOUNDING FILLERS

(75) Inventors: David Camillo, Carrollton, GA (US);
Mark R. Easter, Indianapolis, IN (US)

(73) Assignee: General Cable Technologies Corporation, Highland Heights, KY (US)

( * ) Notice: Subject to any disclaimer, the term of this patent is extended or adjusted under 35 U.S.C. 154(b) by 184 days.

(21) Appl. No.: 12/684,504

(22) Filed: Jan. 8, 2010

(65) Prior Publication Data
US 2011/0172327 A1    Jul. 14, 2011

(51) Int. Cl.
*H02G 15/00* (2006.01)
(52) U.S. Cl. ......... 523/173; 524/447; 524/492; 524/493
(58) Field of Classification Search .................. 523/173; 524/447, 492, 493
See application file for complete search history.

(56) References Cited

U.S. PATENT DOCUMENTS

2010/0010141 A1*  1/2010  Nakamura et al. ............ 524/451
2010/0022683 A1*  1/2010  Easter ........................... 523/173

OTHER PUBLICATIONS

"Handbook of Fillers for Plastics", Katz and Milewski, eds. p. 150 (1987).*

* cited by examiner

*Primary Examiner* — Edward Cain
(74) *Attorney, Agent, or Firm* — Blank Rome LLP

(57) ABSTRACT

A method of treating filler can include the steps of providing the filler, disposing silica within the filler so that a bulk density of the filler is approximately 24 to 26 pounds per cubic feet, forming a silane compound that includes silane and paraffin wax, and combining the silane compound with the filler.

19 Claims, 4 Drawing Sheets

METHOD OF TREATING AND COMPOUNDING FILLERS

FIELD OF THE INVENTION

The invention relates to the treatment and compounding of fillers. In particular, the invention relates to the treatment of a filler to improve its flow characteristics and to uniformly distribute another material throughout the filler.

BACKGROUND OF THE INVENTION

Powdered materials are sometimes added with other ingredients to form cable insulation. These powdered materials are sometimes added to cable insulation as an extender or a flame retardant. For example, kaolin is added as extender, while aluminum trihydrate is added as a flame retardant. Also, in the manufacture of cable insulation, a powdered material, such as powdered kaolin, is often added for smoother extrusion, to reduce the cost of manufacturing, to provide deformation resistance to the cable insulation, and to improve "green strength." Green strength is the ability of an uncured material to resist distortion.

However, manufacturing problems arise from the addition of one or more powdered materials. In particular, the powdered material often does not flow smoothly. Also, other ingredients are often added to such powdered materials, but those additional ingredients are not uniformly distributed throughout the powdered material.

The addition of one or more powdered materials can damage or destroy manufacturing machinery. For example, kaolin is sometimes added as an ingredient in the manufacture of cable insulation, but commercially available kaolin is typically provided as a dry powder. The powdered material is then dropped into a hopper that has an opening at its bottom through which the powdered material flows to a compounding machine. However, such a powdered material does not always flow smoothly. Some powdered materials, such as bottom through which the powdered material flows to a compounding machine. However, such a powdered material does not always flow smoothly. Some powdered materials, such as powdered kaolin, are hydrophilic and can absorb moisture which causes it to clump or cake. Also, flow problems, such as bridging and air pocket formation, can also occur. Bridging, sometimes referred to as arching, occurs when the opening at the base of the hopper is too small or the powdered material is compressed enough to form an arched cap above the opening. Sometime, these flow problems can lead to costly repair or replacement of manufacturing machinery.

One technique to improve the flow of a powdered material is to change the size of the particles making up the powdered material, that is change the particle size distribution of the powdered material. By changing the particle size distribution, the powdered material can be made to flow more smoothly. However, to change the particle size distribution, costly classification is required. Classification classifies each particle according to its particular size. Also, for some applications, changing particle size distribution is undesirable.

Another technique for improving the flow of a powdered material is to treat the material chemically so that it flows more smoothly. By adding the appropriate chemicals, the powdered material can be made to flow more smoothly, but the cost of chemically treating a powdered material is expensive. Furthermore, the powdered material itself is often chemically treated to optimize it for a particular application, and altering the chemical treatment of the powdered material may make it unsuitable for that particular purpose.

In addition to adding chemicals to improve the flow of a powdered material, other ingredients are added to the powdered material to improve its suitability in the manufacture of cable insulation. However, one or more of these additional ingredients are not uniformly distributed throughout the powdered material. One such ingredient is a silane compound which is a hydrophobic chemical compound. For example, calcined kaolin clay requires treatment with silane to prevent moisture absorption during wet electrical testing of medium voltage ethylene-propylene rubber (EPR) insulation. The absorption of moisture during accelerated testing can lead to the formation of trees. However, treating a powdered material, such as kaolin, with silane is approximately half of the commercial cost of kaolin. Furthermore, to form suitable cable insulation, fillers with kaolin must be able to combine chemically with polymers. To combine a filler chemically with polymers, the filler is generally pre-treated with silane, which acts as a coupling agent for the filler and polymers. Preferably, the filler reacts with silane before or during mixing with other ingredients.

Thus, there is a need for improving the flow of powdered materials and to improve the distribution of additional ingredients throughout the powdered material. In particular, there is a need for improving the flow of a powdered material that does not change the particle size distribution, that does not require changing the optimum chemical treatment of the powdered material, and that costs less than presently known methods. Also, there is a need for uniformly distributing other ingredients, such as silane, throughout a powdered material.

SUMMARY OF THE INVENTION

Accordingly, one aspect of the invention may provide a method of treating filler. The method can include the steps of: providing the filler; disposing silica within the filler so that a bulk density of the filler is approximately 20 to 28 pounds per cubic feet; forming a silane compound that includes silane and paraffin wax; and combining the silane compound with the filler.

A preferred aspect of the invention may provide a cable insulation. The cable insulation can include a filler treated with silica so that a bulk density of the filler is approximately 24 to 26 pounds per cubic feet and a silane compound that includes silane and paraffin wax.

Yet another aspect of the invention may provide a cable insulation. The cable insulation can include a filler treated with silica so that a bulk density of the filler is approximately 24 to 26 pounds per cubic feet and a silane compound that includes silane and paraffin wax to form a diluted master batch.

Other objects, advantages and salient features of the invention will become apparent from the following detailed description, which, taken in conjunction with the annexed drawings, discloses an exemplary embodiment of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Referring to FIGS. 1-9, the invention relates to improving the flow properties of a powdered material. The invention also relates to the substantially uniform distribution of at least one other ingredient throughout the powdered material. The invention maintains the particle size distribution of the powdered material, does not require costly classification, and substantially does not affect the chemical treatment of the powdered material.

Figure 1:
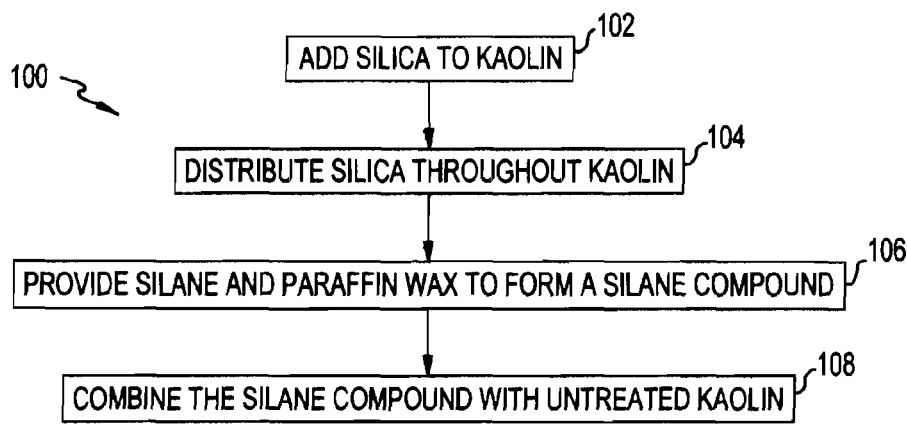
FIG. 1 is a flow chart illustrating the steps of a method according to an exemplary embodiment of the invention.

One embodiment of the invention provides a method for treating a powdered material. Referring to FIG. 1, a method 100 for treating filler is shown. The embodiment is described with reference to a filler and kaolin. Although, the embodiment is described with reference to a filler and kaolin, the method may be suitable for any other appropriate material. For example, the method can be used with other powdered materials and fillers such as clay, talc (aluminum silicate or magnesium silicate), magnesium aluminum silicate, magnesium calcium silicate, calcium carbonate, magnesium calcium carbonate, ATH, magnesium hydroxide, sodium borate, calcium borate, kaolin clay, glass fibers, glass particles, mixtures of the aforementioned, or any other powdered materials and fillers. In embodiments where the additional ingredient is silane, the method can be used with any powdered material or filler that may be reactive with silane. Also, for the sake of an example, the invention is described as providing cable insulation, but the invention can also be used to provide any flexible, high quality, high-strength, rubber-like material with low moisture absorption. Furthermore, in order to simplify the description of the method 100, the steps are described as being performed in a particular order, but the order in which these steps are performed is not important and another order may work.

In step 102, silica, also known as silicon dioxide, is added to kaolin. The addition of silica improves the flow of powdered kaolin. Adding silica to a powdered material alters the bulk density of the powdered material. It also substantially prevents the powdered material from sticking to surfaces in contact with the powdered material. Thus, the powdered material does not generally stick to surfaces of manufacturing machinery.

Untreated kaolin has a bulk density of approximately 35-36 pounds per cubic feet (approximately 561-577 kg/m$^3$), whereas treated kaolin, has a bulk density of approximately 20-28 pounds per cubic feet (approximately 384-416 kg/m$^3$) depending on level of treatment. Treated kaolin with relatively lower bulk density flows more smoothly than untreated kaolin. To lower the bulk density of untreated kaolin to be substantially similar to treated kaolin, silica is added so that its concentration is approximately ¼ to 2% by weight. Preferably, at a silica concentration of approximately ¼ to ½% by weight, the bulk density of untreated kaolin drops from about 35-36 pounds per cubic feet (about 561-577 kg/m$^3$) to about 24-26 pounds per cubic feet (about 384-416 kg/m$^3$).

In one embodiment of the invention, silica, such as silica manufactured by Degussa GmbH, is added to untreated kaolin. Treated and untreated kaolin is available from JM Huber, KaMin, BASF/Englehard Corporation, Burgess, Imerys, Theile, and others. A prefabricated bag of silica is added to a hopper generally full of kaolin. The silica can be added with other ingredients to the kaolin in the same hopper. These other ingredients can include crosslinking agents, antioxidants, processing aids, pigments, dyes, colorants, metal deactivators, oil extenders, stabilizers, and lubricants.

At step 104, silica is distributed throughout the kaolin. Silica and other ingredients can be blended or compounded together by any of the techniques used in the art to blend and compound such mixtures to homogeneous masses. For example, the ingredients may be compounded by multi-roll mills, screw mills, continuous mixers, compounding extruders, Banbury mixers, or some other apparatus for mixing ingredients.

At step 106, silane and a hydrocarbon are combined to form a silane compound. The silane compound can be either in the form of a liquid, a diluted master batch or a concentrated master batch. Preferably, a diluted master batch extends the amount of material making equal distribution within the clay easier. Master batch can be in the form of a powder, small pellet or melted and sprayed. The silane compound can then be distributed throughout another material such that silane is substantially uniformly present throughout the other material. In one embodiment, vinyl or oligomeric silane is made into a diluted master batch with paraffin wax. Silane is commercially available as A-172 and chemically known as vinyl tri (2methoxy-ethoxy) silane, and paraffin wax is commercially available under the name "crystal 2037" made by Crystal PMC. The silane and paraffin wax can form a diluted master batch with about 5% to about 30% silane mixed with untreated kaolin during a compounding process.

Silane master batch is commercially available as EF(A-172)-50, which contains 50% silane and 50% wax. A master batch is a mix of ingredients that is pre-blended or pre-compounded prior to mixing with other ingredients. Typically, master batches are made for ingredients that are difficult to handle or are hazardous in an unmixed state. Clay suppliers, such as JM Huber, which produces Polyfil WC, and BASF/Englehard Corporation, which produces Translink 37, consider the type of silane, the amount of silane, and/or the level of treatment to be proprietary. However, EF(A-172)-50 has an active ingredient concentration of 50%, but a lower active ingredient concentration is desired for the diluted master batch of the invention. In the described embodiment, the diluted master batch has an active ingredient concentration of approximately 16%.

At step 108, the diluted master batch or pellets are combined with untreated kaolin. Mixing low concentration silane master batch or pellets with kaolin provides substantially uniform distribution of silane throughout kaolin that is more uniform than injecting liquid silane into kaolin. In one embodiment, approximately 0.83 parts of silane compound is combined with up to approximately 60 parts of filler.

Adding silane by diluted master batch or pellets provides more uniform distribution than adding silane to filler by using a compounding machine. During the manufacture of cable insulation, kaolin in powdered form can be added to a compounding machine wherein a metering pump adds liquid silane to kaolin. However, the liquid silane tends to soak in one spot and does not diffuse uniformly throughout the filler.

Also, adding silane by diluted master batch or pellets provides more uniform distribution than adding silane by using a concentrated master batch. Concentrated master batch does not mix as uniformly throughout other ingredients because it does not spread or disperse uniformly throughout these other ingredients as diluted master batch or pellets. Adding silane by diluted master batch or pellets provides better distribution of silane throughout a mixture.

Furthermore, adding silane by diluted master batch or pellets results in more uniform distribution than fillers pre-treated with silane, prevents damaging manufacturing equipment, and avoids expensive classification. In the process of pre-treating a filler with silane, the filler can undergo agglomeration during a high temperature drying phase. Agglomeration refers to the process of making larger particles (known as agglomerates) from smaller particles. Agglomerates in powdered filler can plug manufacturing equipment which can lead to expensive repairs and replacements. Some manufacturers classify powdered filler after pre-treating the filler to filter out the agglomerates, but classification to remove agglomerates increases the cost of pre-treated filler. The use of diluted master batch or pellets avoids agglomeration and classification.

Additionally, adding silane by diluted master batch or pellets provides more uniform distribution than adding silane by continuous mixing where ingredients are continuously added as the final mixed compound is extracted. Adding silane during continuous mixing is difficult because silane comes in liquid form and solid, dry, free-flowing ingredients are required for continuous mixing. Both diluted master batch and pellets can provide solid, dry, free-flowing ingredients for continuous mixing.

The use of diluted master batch or pellets reduces manufacturing costs. In one estimate, approximately $400,000 can be saved for an annual compound production of 10 million pounds. Furthermore, the described method uses untreated kaolin that can be supplied at substantially standard feed rates in a continuous mixing process, thereby speeding the manufacturing process.

In embodiments where diluted master batch is used, the diluted master batch can be combined with untreated kaolin and other compounds in an internal mixer to form cable insulation. In an internal mixer, heat and pressure are simultaneously applied. The internal mixer typically has two spiral rotors that rotate in opposite directions. The rotors are positioned to form a ridge between their respective blades, and the blades may have internal pathways for a heating or cooling medium. In alternate embodiments, the diluted master batch is mixed with untreated kaolin during compounding by multi-roll mills, screw mills, continuous mixers, compounding extruders, Banbury mixers, or some other apparatus for mixing ingredients. Surprisingly the method works in continuous compounding machines where residence time is very short. The reaction of silane with filler takes time to occur. Without being held to a single theory the applicant believes the reaction may actually finish after compounding during the pumping and pelletizing phase.

After the ingredients have been substantially uniformly mixed and blended together, the mixture is provided to any end use fabrication. In making a cable the mixture is introduced to an extrusion device wherein the mixture is melted and thereafter the mixture is extruded onto an electrical conductor. Insulated cables are generally fabricated using any of various extrusion methods. In a typical extrusion method, a conducting core may be heated prior to being coated with the extruded mixture. The conducting core can be any suitable electrically conducting material. The electrically conducting material can be metals such as copper or aluminum. The conducting core is pulled through a heated extrusion die which is generally a cross-head die. In the extrusion die, the melted mixture is coated onto the conducting core. After exiting the extrusion die, the conducting core with the melted mixture coating is passed through a heated vulcanizing section or a continuous vulcanizing section if it is desired that crosslinking occur. Afterwards, the coated conducting core passes through a cooling section which is generally an elongated cooling bath. Multiple coats of insulation may be applied by passing the conductive core through the extrusion die several times consecutively. In other extrusion devices, the extrusion dies are capable of applying several layers simultaneously.

For medium voltage applications ranging from about 1 K volts to about 65 K volts, polymeric insulators are often used. Polymeric insulators are made from either polyethylene homopolymers or ethylene-propylene elastomers (also known as ethylene-propylene-rubber (EPR) or ethylene-propylene-diene ter-polymer (EPDM) rubber). EPR typically requires a high level of filler to improve its thermal properties and reduce costs. It is also preferably crosslinked with peroxides, such as dicumyl peroxide. EPDM insulation has excellent resistance to treeing and is often used in high temperature service, such as urban power networks. The polymers for cable insulation can be made by any suitable process which yields the desired polymer with the desired physical strength, electrical properties, treeing resistance, and melting temperature.

Also, polymeric compositions using polyolefin have desirable mechanical properties, dielectric properties, and treeing resistance. Polymeric compositions also have low melting temperatures that provide improved processability when the compositions include peroxide-containing compounds. The base polymer used for insulation can be selected from the group of polymers including ethylene polymerized with at least one comonomer where the comonomer can be $C_3$ to $C_{20}$ alpha-olefins and $C_3$ to $C_{20}$ polyenes. Generally, the alpha-olefins can contain in the range of about 3 to about 20 carbon atoms. Illustrative non-limiting examples of such alpha-olefins are propylene, 1-butene, 1-pentene, 1-hexene, 1-octene and 1-dodecene. The polymers are either ethylene/alpha-olefin copolymers or ethylene/alpha-olefin/diene terpolymers. The polyene can be a diene, which can be a straight chain, branched chain, or cyclic hydrocarbon diene. Examples of suitable dienes are straight chain acyclic dienes such as: 1,3-butadiene, 1,4-hexadiene and 1,6-octadiene; branched chain acyclic dienes such as: 5-methyl-1,4-hexadiene, 3,7-dimethyl-1,6-octadiene, 3,7-dimethyl-1,7-octadiene and mixed isomers of dihydro myricene and dihydroocinene; single ring alicyclic dienes such as: 1,3-cyclopentadiene, 1,4-cylcohexadiene, 1,5-cyclooctadiene and 1,5-cyclododecadiene; and multi-ring alicyclic fused and bridged ring dienes such as: tetrahydroindene, methyl tetrahydroindene, dicylcopentadiene, bicyclo-(2,2,1)-hepta-2-5-diene; alkenyl, alkylidene, cycloalkenyl and cycloalkylidene norbornenes such as 5-methylene-2morbornene (MNB), 5-propenyl-2-norbornene, 5-isopropylidene-2-norbornene, 5-(4-cyclopentenyl)-2-norbornene, 5-cyclohexylidene-2-norbornene, and norbornene. Of the dienes typically used to prepare EPR's, the particularly preferred dienes are 1,4-hexadiene, 5-ethylidene-2-norbornene, 5-vinyllidene-2-norbornene, 5-methylene-2-norbornene and dicyclopentadiene. The especially preferred dienes are 5-ethylidene-2-norbornene and 1,4-hexadiene.

In one embodiment, cable insulation is made with the following ingredients: an elastomer-plastomer compound, kaolin, a polyethylene, a lead master batch, zinc oxide, paraffin wax, dicumyl peroxide, an anti-oxidant, and a diluted master batch. The formulation provided is not meant to be limiting to the invention but is provided to illustrate one embodiment to describe the invention. The elastomer can be, but is not limited to, natural rubber, butyl rubber, buna-N, nitrite rubber, neoprene, ethylene propylene diene monomer (EPDM) rubber, chlorosulfinated polyethylene, fluoroelastomer, combinations of the aforementioned, or some other similar material. The plastomer can be ethylene butene (EB), ethylene propene (EP), ethylene octane (EO), ethylene hexane (EH), or other similar material. The exact elastomers and plastomers are determined by the required properties of the cable insulation. One embodiment has 100% EPDM, another has 100% EB, and another has a mixture of EPDM and EB. In yet another embodiment, up to approximately 60 parts of kaolin may be used. In a still further embodiment, the anti-oxidant is trimethylquinoline, and the lead master batch is 90% lead in EPDM.

A cable insulation produced with untreated kaolin in accordance with an embodiment of the invention exhibited the test results shown in FIGS. 2-11. As shown in those figures, cable insulation produced in accordance with an embodiment of the invention has thus far shown, at least, equivalent performance to cable insulation using pre-treated kaolin, such as EI 4728 A25 and EI 4728 A30, in specific inductive capacitance (SIC) and dielectric loss testing. Preliminary data is also available from a one-year qualification test being conducted under the standards of the Association of Edison Illumination Company (AEIC) CS-8 "Specification for Extruded Dielectric Shielded Power Cables Rated 5 through 46 kV." The AEIC CS-8 tests include, among other tests, a high voltage time test, a time dielectric loss test, an insulation capacitance test, an insulation resistance test, and square wire test.

Figure 2:
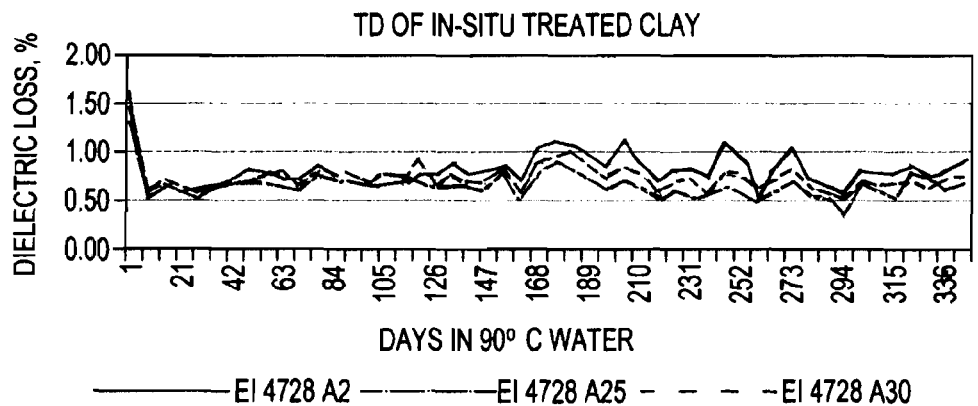
FIG. 2 is a plot of dielectric loss test results for a cable insulation made in accordance with the method shown in FIG. 1 and cable insulations made with treated kaolin.

In FIG. 2, dielectric loss test results are shown in a plot. The abscissa of the plot is time in days, and the ordinate is dielectric loss, as measured in percent power factor. The plot includes data for three variations of cable insulation immersed in 90° C. (194° F.) water: (1) cable insulation with untreated kaolin, designated as EI 4728 A2, in accordance with an embodiment of the invention; (2) cable insulation with kaolin treated with A25 silane, designated as EI 4728 A25; and (3) cable insulation with kaolin treated with A30 silane, designated as EI 4728 A30. All three variations of cable insulation exhibit substantially equivalent results. Thus, cable insulation with untreated kaolin (EI 4728 A2) in accordance with the invention has substantially similar dielectric losses as cable insulation with treated kaolin (EI 4728 A25 and EI 4728 A30).

Figure 3:
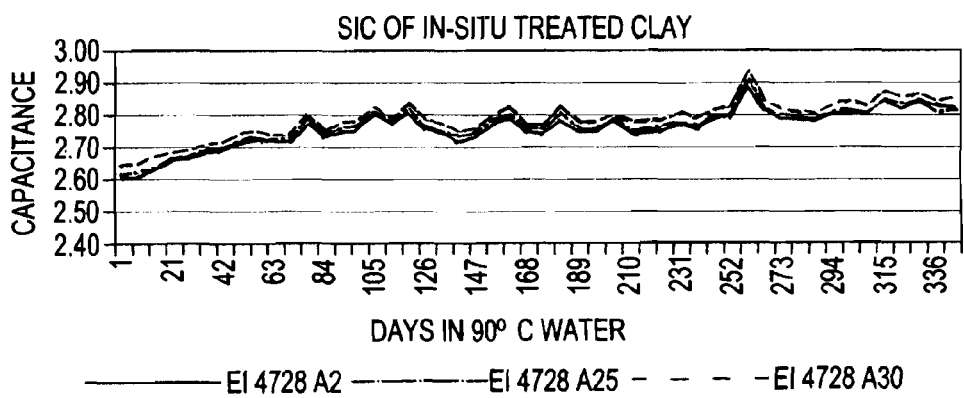
FIG. 3 is a plot of specific inductive capacitance test results for the cable insulations tested for the plot of FIG. 2.

Referring to FIG. 3, specific inductive capacitance results for the three variations of cable insulation described above (EI 4728 A2 with untreated kaolin in accordance with an embodiment of the invention, EI 4728 A25 with treated kaolin, and EI 4728 A30 with kaolin treated with a higher concentration of silane) are shown. The abscissa is time in days, and the ordinate is specific inductive capacitance. After being immersed in 90° C. (194° F.) water, all three variations of cable insulation exhibit substantially equivalent results. Thus, cable insulation with untreated kaolin (EI 4728 A2) in accordance with the invention has substantially the same specific inductive capacitance as cable insulation with treated kaolin (EI 4728 A25 and EI 4728 A30).

Figure 4:
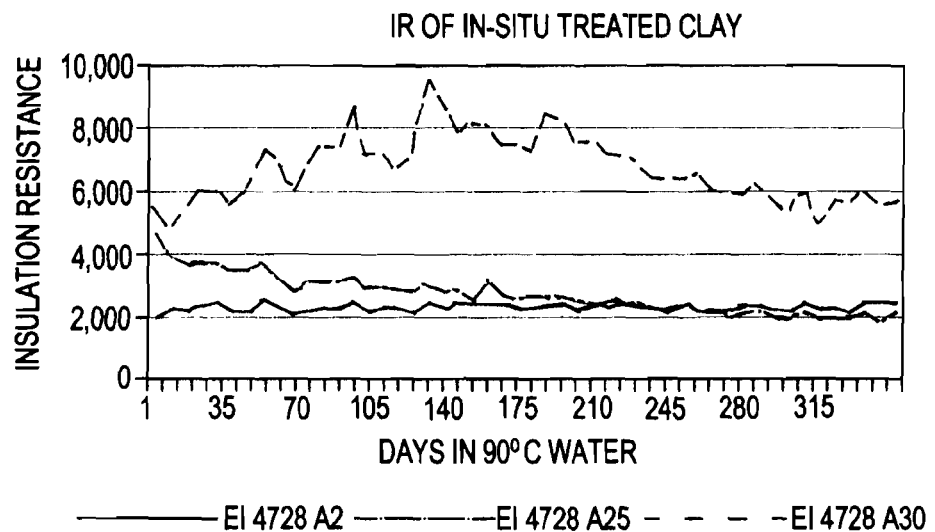
FIG. 4 is a plot of insulation resistance stability test results for the cable insulations tested for the plot of FIG. 2.

Referring to FIG. 4, insulation resistance stability results are plotted for the three variations of cable insulation, EI 4728 A2, EI 4728 A25, and EI 4728 A30. Insulation resistance stability, on the ordinate, is provided in K Ohms, and the abscissa indicates days the three variations of cable insulation were immersed in 90° C. (194° F.) water. As shown, all three variations show stable insulation resistance.

Figure 5:
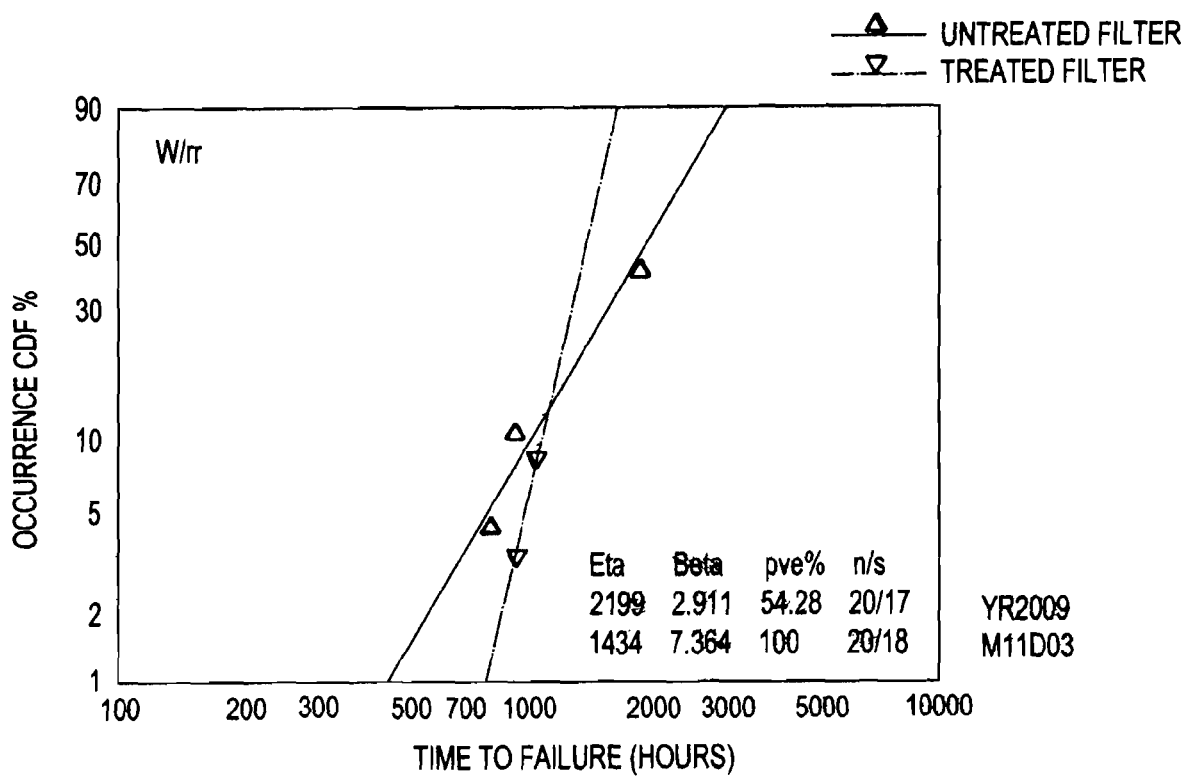
FIG. 5 is a plot of square wire test results for a cable insulations made in accordance with the method shown in FIG. 1 and a cable insulation made with treated kaolin.

Referring to FIG. 5, square wire test results are shown for two variations of cable insulation (EI 4728 A2 with untreated kaolin in accordance with an embodiment of the invention and EI 4728 A25 with treated kaolin) on a Weibull plot. In a square wire test, a conductor with a square-shaped cross-section is embedded in the tested cable insulation, but the cable insulation has a circular-shaped cross-section. Thus, the thickness of the cable insulation around the square-shaped conductor is not as uniform as it would be if the conductor had a circular cross-section. Instead, the thickness of the cable insulation varies, being thinnest near the corners of the square-shaped conductor, and thicker away from the corners of the square-shaped conductor. The ordinate indicates the occurrence of capacitance discharge failure in percent on a logarithmic scale, and the abscissa indicates time in hours with logarithmic scaling. Beta, eta, $r^2$, and n/s values are also provided in a legend on the plot. A beta value of less than 1 indicates random failure, and a beta value of greater than 1 indicates that the cable insulation is worn out. Similar beta values indicate similar failure modes. The cables are compared at their respective eta values which correspond to 62.3% of each cable's characteristic life. The $r^2$ values provide an indication of how well the line fits the observed data points. Lastly, the n/s values are the ratios of data points sampled versus number of data points suspended due to an unrelated failure, such as an electrical disconnection instead of insulation failure. As shown, both variations of the cable, EI 4728 A2 and EI 4728 A25, have generally similar results. At lower values of occurrence of capacitance discharge failure, the A2 cable insulation made in accordance with an embodiment of the invention takes more time for failure to occur than the A25 cable insulation. However, at higher values of occurrence of capacitance discharge failure, the A25 cable insulation apparently takes more time for failure to occur than the A2 cable insulation.

Figure 6:
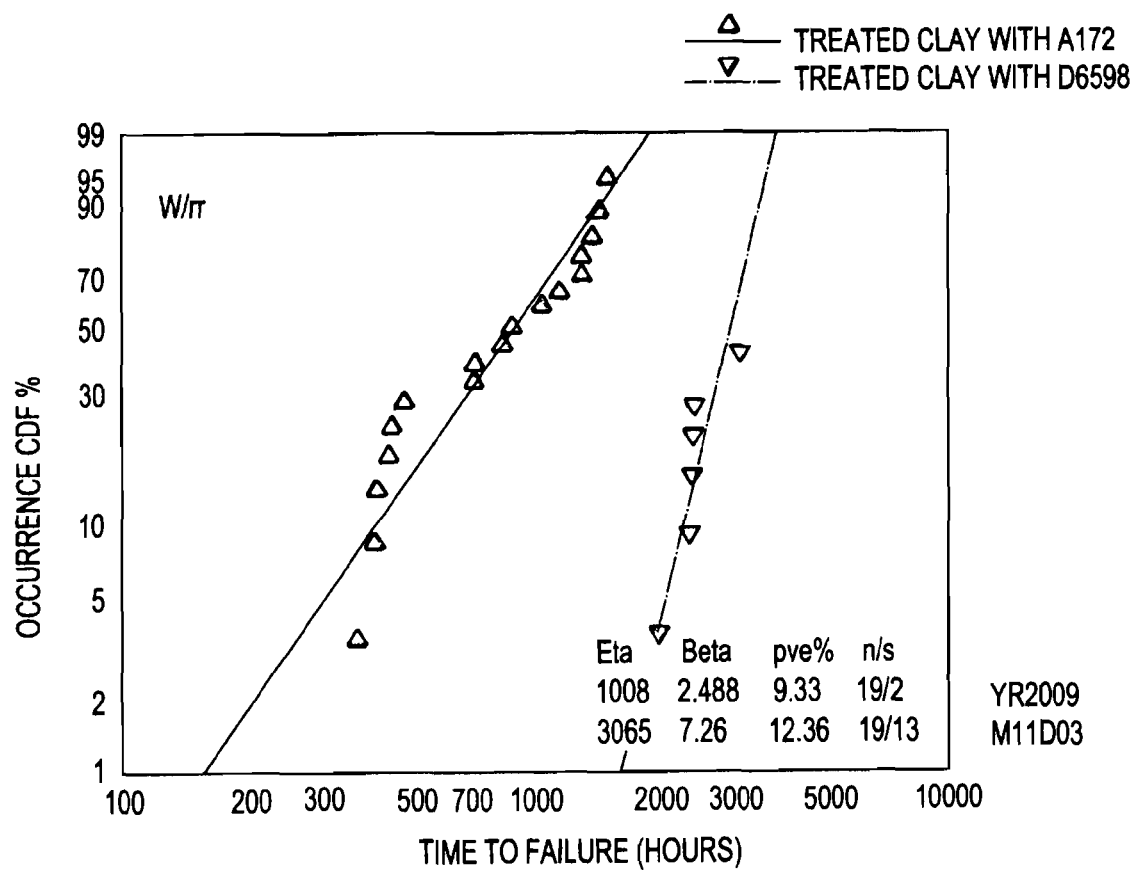
FIG. 6 is a plot of square wire test results for another embodiment of a cable insulation made in accordance with the method shown in FIG. 1 and a cable insulation made with treated kaolin.

Referring to FIG. 6, square wire test results are shown for a cable with treated kaolin, designated as "treated clay with A172" on the plot, and for a cable with untreated kaolin with oligomeric silane, designated "treated clay with D6598" on the plot. The testing of these two cables is similar to the test performed for the plot of FIG. 5. As in FIG. 5, the ordinate indicates the occurrence of capacitance discharge failure in percent on a logarithmic scale, and the abscissa indicates time in hours with logarithmic scaling. As shown in the plot, the D6598 cable insulation made in accordance with an embodiment of the invention shows better results than the A172 cable insulation.

Figure 7:
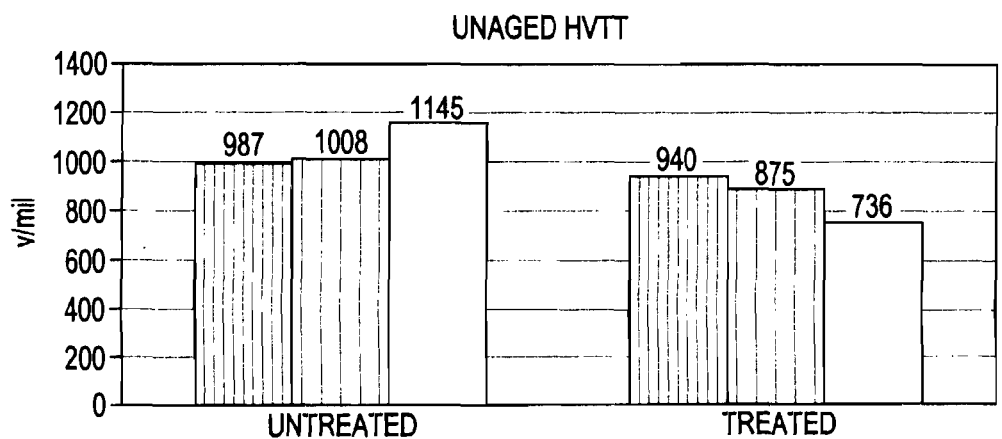
FIG. 7 is a plot of high voltage time test results for treated cable insulation and untreated cable insulation in accordance with an embodiment of the invention.
Figure 8:
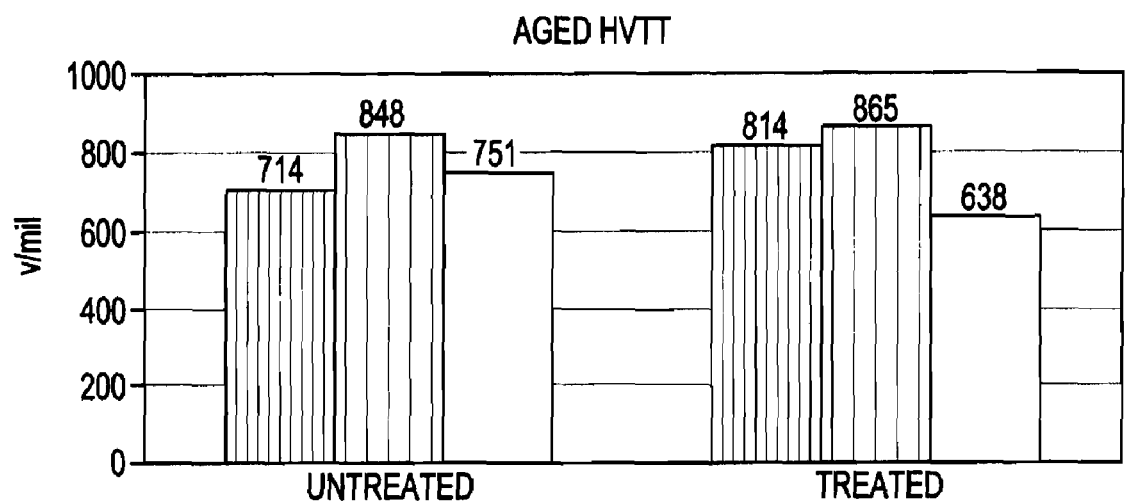
FIG. 8 is a plot of high voltage time test results for the treated and untreated cable insulations tested for the plot of FIG. 7 aged 60 days.
Figure 9:
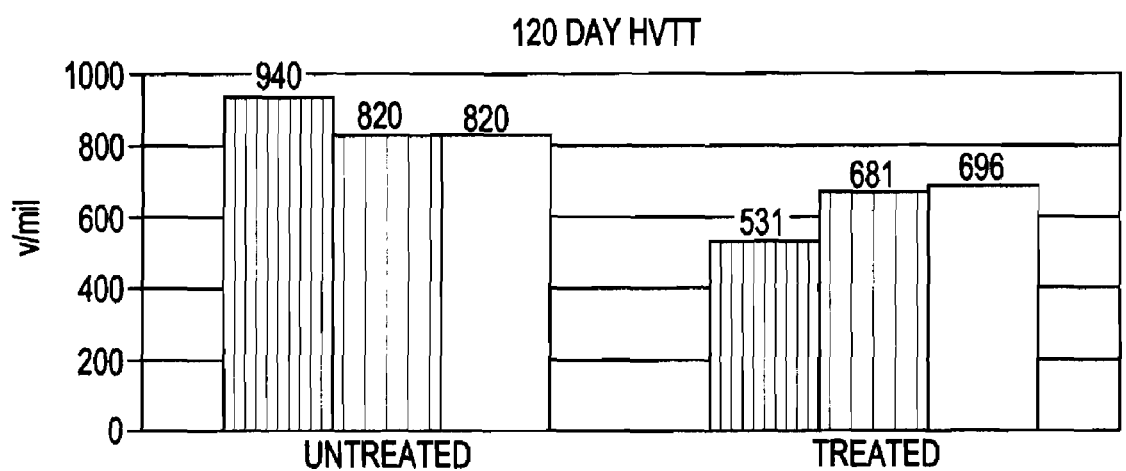
FIG. 9 is a plot of high voltage time test results for the treated and untreated cable insulations tested for the plot of FIG. 7 aged 120 days.

Referring to FIGS. 7-9, high voltage time test results are shown for treated and untreated cable insulation in accordance with an embodiment of the invention. The untreated cable insulation shown in the plot is designated DI-5754-03. A high-voltage time test determines when the cable insulation undergoes dielectric breakdown. In FIG. 7, the cable insulation is not aged before it is tested for dielectric breakdown. Three separate trials of the test for the untreated cable insulation (DI-5754-03) are plotted, along with three separate trials of a treated cable insulation. The untreated cable insulation exhibits better results than the treated cable insulation. Turning to FIG. 8, aged high voltage time test results are shown for the treated and untreated cable insulation where both cable insulations are aged 60 days before being tested for dielectric breakdown. Both cable insulations show substantially the same results. In FIG. 9, high voltage time test results are shown for the untreated and treated cable insulations, both aged 120 days. The untreated cable insulation exhibits better performance than the treated cable insulation.

Compounds for the cable insulation with untreated kaolin in FIGS. 2-4 and the cable insulation with untreated kaolin in FIGS. 7-9 were made with a continuous mixer, wherein the compounds resided for less than one minute. The test results, as shown in these figures, are comparable to pre-treated filler.

While a particular embodiment has been chosen to illustrate the invention, it will be understood by those skilled in the art that various changes and modifications can be made therein without departing from the scope of the invention as defined in the appended claims.

For example, although the described embodiment has kaolin as the powdered material, the powdered material can be any other material that has a substantially powdery form. Furthermore, in the described embodiment, silica is added, but precipitant silica, crushed silica, ground silica, silica pellets, or other forms of silica may be added.

What is claimed is:

1. A method of treating filler, the method comprising the steps of:
   providing the filler;
   disposing silica within the filler so that a bulk density of the filler is approximately 24 to 26 pounds per cubic feet;
   forming a silane compound that includes silane and paraffin wax; and
   combining the silane compound with the filler.

2. A method of treating kaolin according to claim 1, wherein the silica is disposed within the filler to a concentration of approximately ¼ to ½% by weight.

3. A method of treating kaolin according to claim 1, wherein the silica comprises precipitant silica.

4. A method of treating kaolin according to claim 1, wherein approximately 0.83 parts of the silane compound is combined with up to approximately 60 parts of the filler.

5. A method of treating kaolin according to claim 1, wherein the silane compound is formed a diluted master batch.

6. A method of treating kaolin according to claim 1, wherein the silane compound is provided as pellets.

7. A cable insulation, comprising:
   a filler treated with silica so that a bulk density of the filler is approximately 24 to 26 pounds per cubic feet;
   a silane compound that includes silane and paraffin wax; and
   a lead master batch.

8. The cable insulation of claim 7, further comprising an elastomer.

9. The cable insulation of claim 7, further comprising a plastomer.

10. The cable insulation of claim 8, wherein the elastomer is ethylene propylene diene monomer (EPDM) rubber.

11. The cable insulation of claim 9, wherein the plastomer is ethylene butene.

12. The cable insulation of claim 7, further comprising polyethylene.

13. The cable insulation of claim 7, further comprising zinc oxide.

14. The cable insulation of claim 7, further comprising dicumyl peroxide.

15. The cable insulation of claim 7, further comprising an antioxidant.

16. The cable insulation of claim 7, wherein the silane compound is formed as a diluted master batch.

17. The cable insulation of claim 7, wherein the silane compound is provided as pellets.

18. A cable insulation, comprising:
   a filler treated with silica so that a bulk density of the filler is approximately 24 to 26 pounds per cubic feet;
   a silane compound that includes silane and paraffin wax to form a diluted master batch; and
   a lead master batch.

19. A cable insulation, comprising:
   a filler treated with silica so that a bulk density of the filler is approximately 24 to 26 pounds per cubic feet;
   a silane compound that includes silane and paraffin wax; and
   dicumyl peroxide.

* * * * *